(12) United States Patent
Brandner

(10) Patent No.: US 7,665,254 B2
(45) Date of Patent: Feb. 23, 2010

(54) WALL CLADDING PANEL FOR THE OUTSIDE WALL OF A BUILDING WITH A SOLAR GENERATOR

(75) Inventor: Hans Brandner, Dachau (DE)

(73) Assignee: BBG GmbH & Co. KG, Mindelheim (DE)

( * ) Notice: Subject to any disclaimer, the term of this patent is extended or adjusted under 35 U.S.C. 154(b) by 483 days.

(21) Appl. No.: 11/286,298

(22) Filed: Nov. 25, 2005

(65) Prior Publication Data

US 2007/0240369 A1 Oct. 18, 2007

(51) Int. Cl.
*E04D 13/18* (2006.01)
*E04H 14/00* (2006.01)

(52) U.S. Cl. .................. 52/173.3; 136/244; 136/246
(58) Field of Classification Search ............ 52/173.3, 52/786.1, 786.13; 136/244, 246; 126/713
See application file for complete search history.

(56) References Cited

U.S. PATENT DOCUMENTS

| 4,223,667 | A | | 9/1980 | Paymal |
| 4,314,544 | A | * | 2/1982 | Muller et al. ............ 126/713 |
| 6,072,115 | A | * | 6/2000 | Inoue et al. ............. 136/244 |
| 6,401,428 | B1 | * | 6/2002 | Glover et al. ........... 52/786.13 |
| 6,576,830 | B2 | * | 6/2003 | Nagao et al. ............ 136/244 |
| 6,750,391 | B2 | * | 6/2004 | Bower et al. ............ 136/244 |
| 6,800,801 | B2 | * | 10/2004 | Sasaoka et al. .......... 136/246 |
| 7,012,188 | B2 | * | 3/2006 | Erling .................... 136/251 |

* cited by examiner

*Primary Examiner*—Richard E Chilcot, Jr.
*Assistant Examiner*—Chi Q Nguyen
(74) *Attorney, Agent, or Firm*—David S. Safran; Roberts Mlotkowski Safran & Cole, P.C.

(57) ABSTRACT

A wall cladding panel for the outside wall of a building having a solar generator and a frame which surrounds the panel. To produce a wall cladding panel which can be easily produced and installed, it is provided that the frame is made as an injected or foamed plastic frame (12, 17) into which elements (11A, 15A) for attachment of the wall cladding panel (7, 8) are integrated.

14 Claims, 3 Drawing Sheets

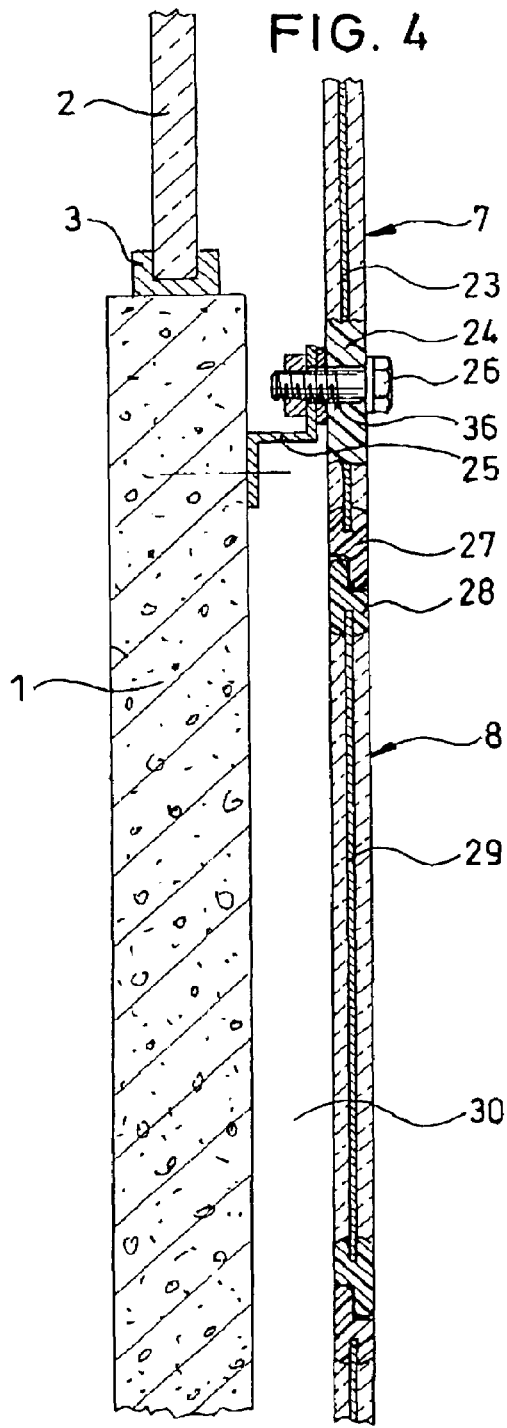
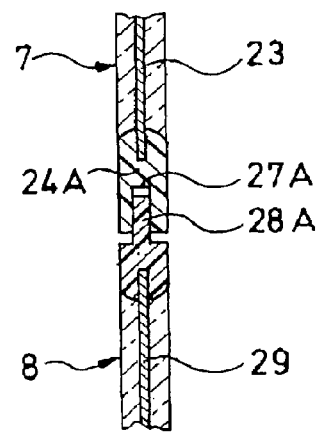
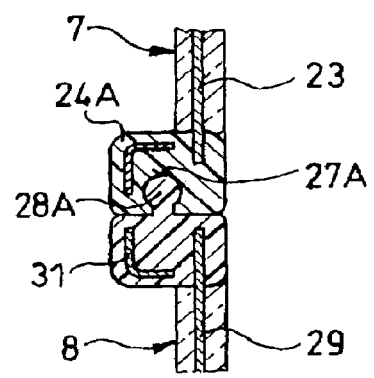

WALL CLADDING PANEL FOR THE OUTSIDE WALL OF A BUILDING WITH A SOLAR GENERATOR

BACKGROUND OF THE INVENTION

1. Field of the Invention

The invention relates to a wall cladding panel for the outside wall of a building with a solar generator and with a frame which surrounds the panel.

2. Description of Related Art

These wall cladding panels are known, for example, from U.S. Pat. No. 4,223,667. Here, the frame has a metal profile which, with one leg, overlaps a glass pane outside.

The disadvantage of the known wall cladding panels is that the frame is not flush with the outer surface, and moreover, installation and sealing of the wall cladding panels are complex.

SUMMARY OF THE INVENTION

The object of the invention is to devise an improved wall cladding panel which eliminates the above described disadvantages.

This object is achieved by a wall cladding panel for an outside wall of a building, having a solar generator and a frame which surrounds the solar generator, the frame being an injected or foamed plastic frame into which means for attachment of the wall cladding panel are integrated, and in which stiffening profiles are integrated into the plastic frames.

Embodiments of the wall cladding panels in accordance with the invention are explained in detailed below with reference to the drawings.

BRIEF DESCRIPTION OF THE DRAWINGS

FIG. 4 shows an alternative embodiment to FIG. 1, FIG. 5 shows another alternative for an interlocking connection of adjacent wall cladding panels, and FIG. 6 shows another alternative for an interlocking connection of adjacent wall cladding panels.

DETAILED DESCRIPTION OF THE INVENTION

Figure 1:
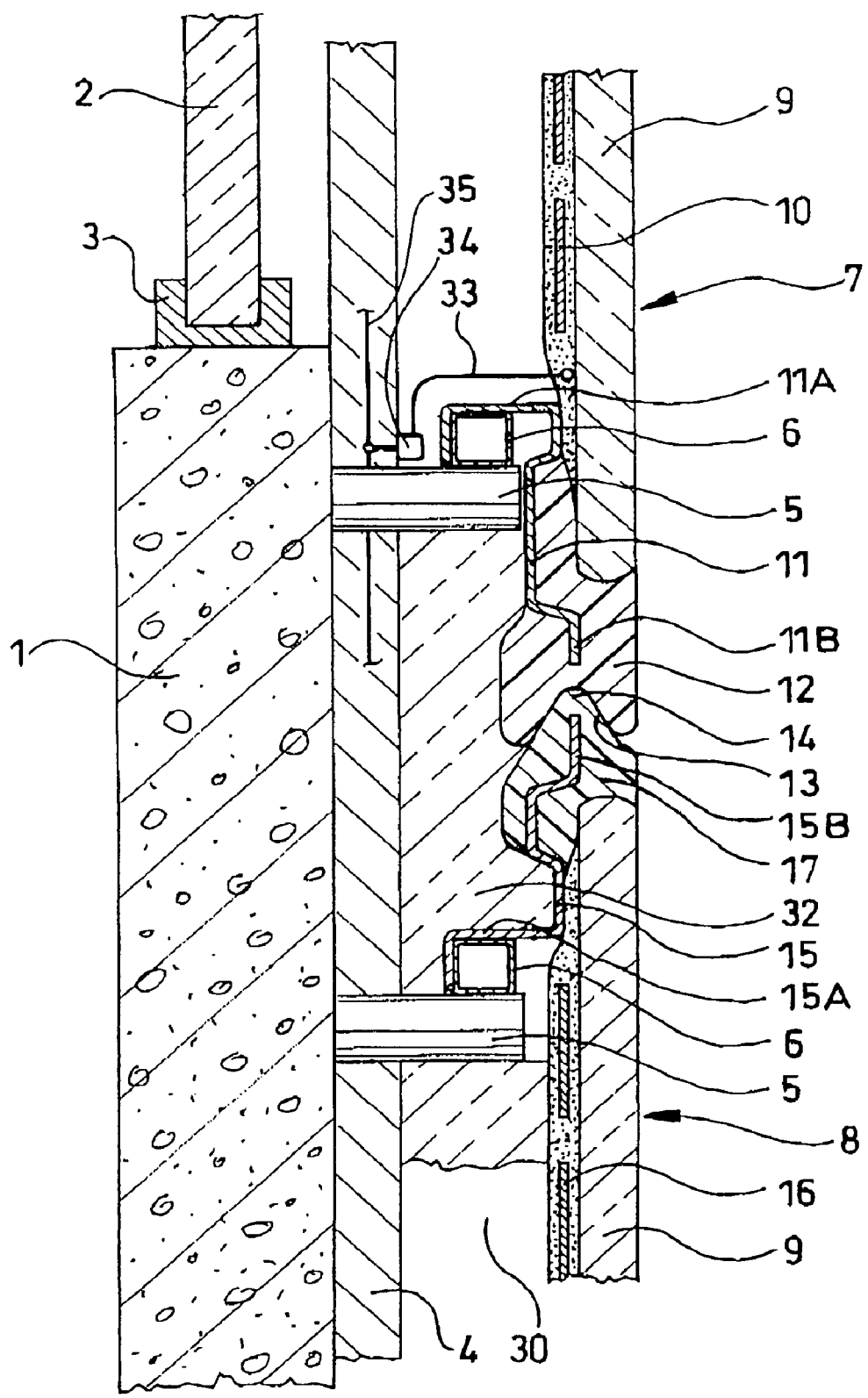
FIG. 1 shows a section through two wall cladding panels located on the outside wall of the building in their joining area.

The outside building wall 1 shown in FIG. 1 has a window pane 2 which is supported in a window frame 3 and which is faced with a structure of wall cladding panels which is installed at a distance to the window pane. In the illustrated extract only a single connecting area between two adjacent wall cladding panels 7, 8 is shown.

To attach the wall cladding panels 7, 8, the outer side of the outside building wall 1 is provided with a substructure 4 on which fastening bolts 5 are mounted at a certain distance and projecting outward. There are transversely running fixing profiles 6 on the fastening bolts 5.

The upper illustrated wall cladding panel 7 has a glass pane 9 on its outer side and on the inner side, facing the outside building wall 1, the pane is provided with a group of solar cells 10 which are embedded, for example, in hot melt-adhesive films that are connected to the inside of the glass pane 9. The solar cells 10, which are arranged at the height of the window pane 2, are made as transparent solar cells so that it is possible to look through them and for light to pass. The group of solar cells 10 is connected to the glass pane 9 and a support frame 11 by a plastic frame 12 which is molded on in the edge area of the glass pane 9 by foaming or injecting on. Part of the support frame 11 extends as a stiffening profile 11B in the material of the plastic frame 12 which is formed preferably from polyurethane. Another part of the support frame 11 has a support angle 11A. The support angle 11A is bent down and has an end which projects out of the plastic material of the plastic frame 12 at the inner side of the wall cladding panel 7 and is used to install the wall cladding panel 7 on the fixing profile 6. Fixing takes place by simply hanging from above. The plastic frame 12, in the area of its edge which is directed downward, has a V-shaped receiver 13 which is engaged by a complementarily shaped projection 14 of the wall cladding panel 8 which is located adjacently underneath.

This wall cladding panel 8 is similar in its structure to the upper wall cladding panel 7. On the inside of the glass pane 9, there is, in turn, a group of solar cells 16 which are, however, in this case, made as nontransparent monocrystalline or nontransparent polycrystalline solar cells. These solar cells 16 have higher efficiency than the transparent solar cells 10. Therefore, these wall cladding panels 8 with crystalline solar cells 16 are preferably used in the areas of the outside building wall 1 which are made closed without window openings. The wall cladding panel 8 has a plastic frame 17 which connects the group of solar cells 16 in the edge area of the glass pane 9 to a support frame 15. The support frame 15 is, in turn, embedded with a stiffening profile 15B in the plastic material of the plastic frame 17 and has a support angle 15A which projects on the inner side with an end which is bent down and which is used for installation by hanging on a fixing profile 6.

Between the substructure 4 and the wall cladding panels 7, 8, there is either an intermediate space 30 which is filled with air as the insulating layer, or this intermediate space is filled with an insulating material 32 as the area of the window pane 2 is left open. In any case, the wall cladding panels 7, 8, in addition to generating electric power also contribute greatly to heat insulation of the building.

Figure 2:
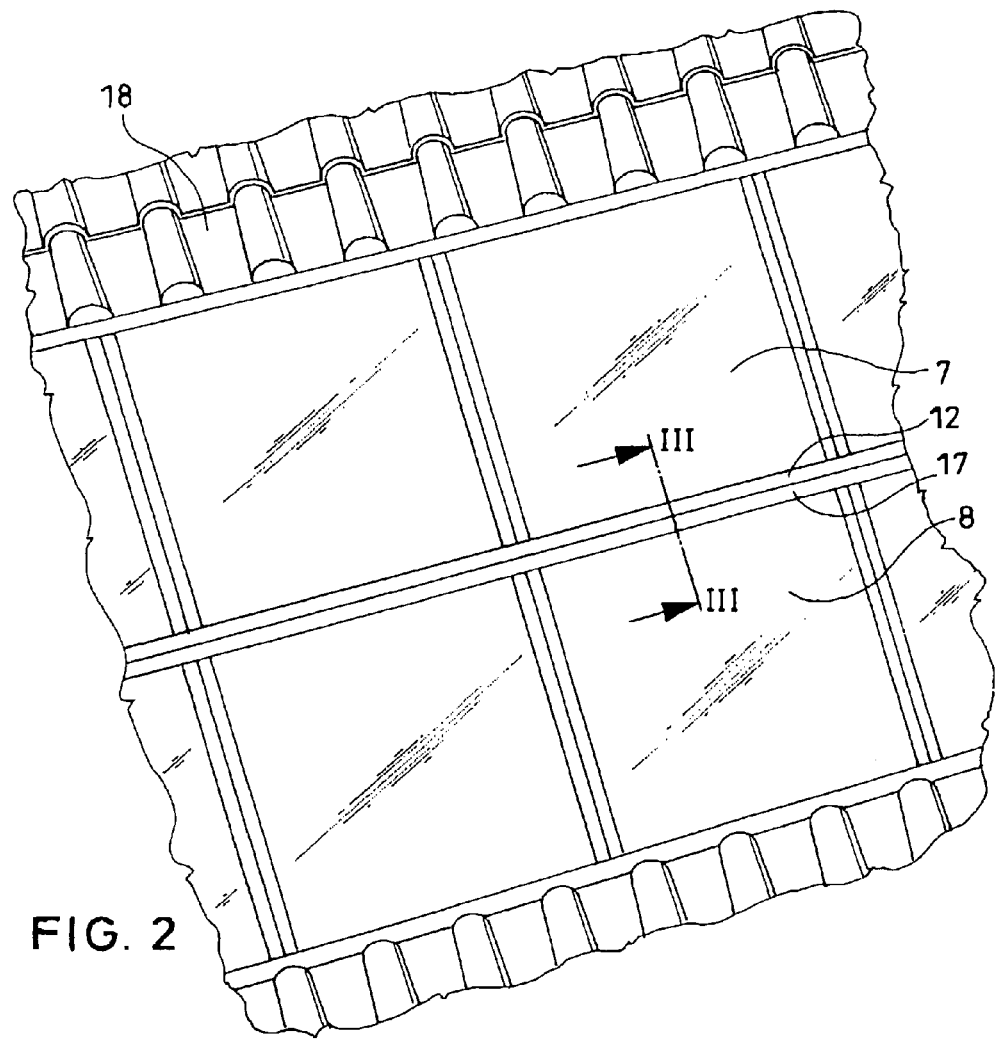
FIG. 2 is a perspective top view of a building roof with several wall cladding panels which are interconnected to the surrounding roof tiles.
Figure 3:
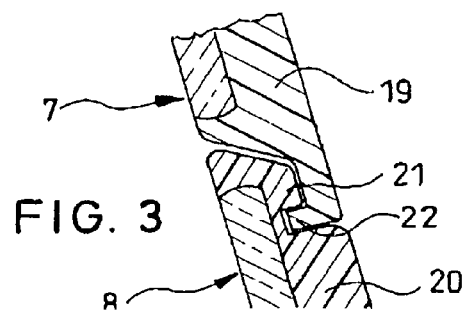
FIG. 3 is a sectional view through the joining area of two adjacent wall cladding panels according taken alone line III-III in FIG. 2.

The roof of a building can also be considered an outside building wall, as shown by the embodiment illustrated in FIGS. 2 & 3. Here, several wall cladding panels 7, 8 are embedded in a roof surface which is otherwise covered with roof tiles 18; the panels can be made both with simple glazing as the window surface and also provided with solar cells. Both transparent solar cells 10 and also opaque solar cells 16 are possible depending on whether transparency is desired and which efficiency is to be achieved in the generation of electric power. As FIG. 3 shows, the wall cladding panels 7, 8, are peripherally foamed in the edge area of a respective plastic frame 19, 20, on these plastic frames moldings 21, 22, being formed which enable overlapping, interlocking and watertight engagement of two adjacent wall cladding panels with one another or also with the adjacent roof tiles 18.

In the embodiment as shown in FIG. 4, a group of wall cladding panels 7, 8, without a continuous substructure, is mounted on an outside building wall 1. To do this, fixing angles 25 are attached, for example, by screws to the masonry of the outside building wall 1. Then, the wall cladding panels 7, 8, are attached to these fixing angles 25, for example, by mounting screws 26 which penetrate holes 36 which are integrated in the plastic frame 24 in the edge area as a means for attachment. The holes 36 can of course—differently than shown—also be made to hold countersunk head screws so that projecting screw heads do not disrupt the smooth appearance of the facade. The wall cladding panel 7 which is located at the height of the window pane 2 is provided with a group of transparent solar cells 23 so that it is possible to look through the window pane 2 and for light to be incident on it. The plastic frame 24 on its edge pointed down has a molding 27 which is made with a projection which points down and which lies outside to be complementary to a structural part 28 which is located on the upper edge of the wall cladding panel 8 which follows underneath. The wall cladding panel 8 lies in the closed area of the outside building wall 1 and is, therefore, provided with crystalline solar cells 29.

Other examples of interlocking engagement and interlocking overlapping of adjacent wall cladding panels 7, 8, are shown in FIGS. 5 & 6. In FIG. 5, a plastic frame 24A on a molding 27 on the lower edge of a wall cladding panel 7 in the middle area has a groove 27A which is rectangular in cross section and which is bordered by two projections on the inside and on the outside. A projection 28A of the structural part 28 which extends up in the middle on the top edge of an underlying wall cladding panel 8 engages this groove 28 by interlocking, the overlapping connection of the two structural parts 27, 28, enabling balancing of the wall cladding panels 7, 8, in the lengthwise direction, as is required, for example, for compensation of thermal expansion.

In the embodiment as shown in FIG. 6, a plastic frame 24A on the lower edge of a wall cladding panel 7 has a molding 27A with a recess which is keyhole-shaped in cross section and which is engaged by a complementarily shaped projection of a structural part 28A on the plastic frame of an underlying wall cladding panel 8. In this case, an especially tight and reliable connection between the structural parts is formed so that this facade does not offer an attack surface to high winds. Stiffening profiles 31 are also embedded here into the plastic frame for stiffening.

The electric power generated in the solar cells 10, 16 or 23, 29 is delivered to an electric conductor 35 which is connected to the outside building wall 1 via a contact 33 embedded, preferably in the plastic frame 12, 17 or 19, 20. The conductor 35 can be integrated, for example, into the substructure 4. In doing so, preferably, on the outer side of the substructure 4 there are sockets 34 which engage the contact 33 when the wall cladding panels 7, 8 are installed directly by correspondingly projecting pins or by manual coupling. In the same way, groups of wall cladding panels can be electrically wired to one another by means of integrated contacts. In doing so, electronic components such as rectifiers or inverters for conversion of the electric power can also be integrated preferably into the plastic frame of the wall cladding panels.

The invention devises wall cladding panels which can be easily produced in large numbers in the corresponding molds by peripheral foaming or peripheral injection and based on integrated attachment means can be easily mounted on an outside building wall or in the roof of a building, which provide for a smooth appearance and easy cleaning of the facades as a result of the preferably flush arrangement of the plastic frames with the outside glass panes, and which create a tight group of wall cladding panels with outstanding heat insulation by the interfitting elements which are made in the edge area for interlocking engagement or interlocking overlapping. The flexible execution with opaque and/or transparent solar cells makes it possible combine the ability to look partially through with good energy yield.

What is claimed is:

1. A wall cladding panel for an outside wall of a building, comprising:
    a solar generator,
    a glass pane which lies on an outer side of the wall cladding panel,
    a frame which surrounds the solar generator and the glass pane,
    wherein the frame is an injected or foamed plastic frame into which means for attachment of the wall cladding panel are integrated,
    wherein stiffening profiles are integrated into the plastic frames, and
    wherein the plastic frame, in an edge area, on opposing sides, has elements which are complementarily shaped relative to one another for form-fitting interlocking or overlapping engagement adjoining edges of adjacent wall cladding panels.

2. The wall cladding panel as claimed in claim 1, wherein the means for attachment are provided on the stiffening profiles.

3. The wall cladding panel as claimed in claim 1, wherein the means for attachment are support angles for engagement on a fixing profile which, in an installed state of the panel, is connected to the outside wall of the building.

4. The wall cladding panel as claimed in one of claims 1, wherein the means for attachment are made as holes which are used for passage of fastening screws.

5. The wall cladding panel as claimed in claim 1, wherein the solar generator comprises crystalline solar cells for mounting, in an installed state, on a closed area of the outside wall of the building.

6. The wall cladding panel as claimed in claim 1, wherein the solar generator comprises transparent solar cells for mounting, in an installed state, on a windowed area of the outside wall of the building.

7. The wall cladding panel as claimed in claim 6, wherein a glass pane overlies the solar cells at an outer side thereof, and wherein the glass pane surrounded by the plastic frame.

8. The cladding panel as claimed in claim 7, wherein the solar generator comprises crystalline solar cells for mounting, in an installed state, on a closed area of the outside wall of the building.

9. The cladding panel as claimed in claim 7, wherein the solar generator comprises transparent solar cells for mounting, in an installed state, on a windowed area of the outside wall of the building.

10. The wall cladding panel as claimed in claim 1, wherein means for making electrical contact between the solar generator and a socket of an electrical conductor which is located on the outside wall of the building are integrated into the plastic frame.

11. The wall cladding panel as claimed in claim 10, wherein means for making electrical contact between solar cells of the solar generator are integrated into the plastic frame.

12. The wall cladding panel as claimed in claim 11, wherein the panel has a smooth outer surface.

13. The wall cladding panel as claimed in claim 1, wherein means for making electrical contact between solar cells of the solar generator are integrated into the plastic frame.

14. A wall cladding panel assembly formed of a plurality of wall cladding panels, each wall cladding panel comprising:
    a solar generator,
    a glass pane which lies on an outer side of the wall cladding panel,
    a frame which surrounds the solar generator and the glass pane,
    wherein the frame is an injected or foamed plastic frame into which means for attachment of the wall cladding panel are integrated,
    wherein stiffening profiles are integrated into the plastic frame, and
    wherein the plastic frame, in an edge area, on opposing sides, has elements which are complementarily shaped relative to one another enabling form-fitting interlocking or overlapping engagement of adjoining edges of the frames of adjacent wall cladding panels.

* * * * *